United States Patent
Inoue et al.

(10) Patent No.: US 7,926,337 B2
(45) Date of Patent: Apr. 19, 2011

(54) VEHICLE LOCKING DEVICE AND VEHICLE LOCKING METHOD

(75) Inventors: Isamu Inoue, Kanagawa (JP); Atsushi Shibata, Tokyo (JP); Naoki Umeda, Tokyo (JP); Shuichi Tsukatsune, Tokyo (JP); Haruhiko Tateno, Tokyo (JP); Takahiro Matsumoto, Tokyo (JP)

(73) Assignees: Ono Sokki Co., Ltd., Kanagawa (JP); Honda Motor Co., Ltd., Tokyo (JP)

( * ) Notice: Subject to any disclaimer, the term of this patent is extended or adjusted under 35 U.S.C. 154(b) by 191 days.

(21) Appl. No.: 12/323,975

(22) Filed: Nov. 26, 2008

(65) Prior Publication Data

US 2009/0133484 A1    May 28, 2009

(30) Foreign Application Priority Data

Nov. 27, 2007   (JP) ................................. 2007-306524

(51) Int. Cl.
    *G01L 3/00* (2006.01)
(52) U.S. Cl. ............... 73/116.08; 73/116.01; 73/116.05; 73/117.01
(58) Field of Classification Search .. 73/116.05–116.08, 73/117.01
    See application file for complete search history.

(56) References Cited

U.S. PATENT DOCUMENTS

| | | | | |
|---|---|---|---|---|
| 3,520,180 | A * | 7/1970 | Ris et al. | 73/670 |
| 3,680,368 | A * | 8/1972 | Warsaw | 73/116.06 |
| 4,455,866 | A * | 6/1984 | Barrigar | 73/116.07 |
| 4,862,737 | A * | 9/1989 | Langer | 73/116.07 |
| 5,111,685 | A * | 5/1992 | Langer | 73/118.01 |
| 5,402,674 | A * | 4/1995 | Ganzhorn et al. | 73/116.06 |
| 5,756,889 | A * | 5/1998 | D'Angelo | 73/116.08 |
| 6,044,696 | A * | 4/2000 | Spencer-Smith | 73/118.01 |
| 6,427,528 | B1 * | 8/2002 | Yamakado et al. | 73/121 |
| 6,446,501 | B1 * | 9/2002 | Domeck et al. | 73/146 |
| 7,054,727 | B2 * | 5/2006 | Kemp et al. | 701/29 |
| 7,058,488 | B2 * | 6/2006 | Kemp et al. | 701/33 |
| 2003/0230137 | A1 * | 12/2003 | Kemp et al. | 73/117 |

FOREIGN PATENT DOCUMENTS

JP    10-307082    11/1998

* cited by examiner

*Primary Examiner* — Freddie Kirkland, III
(74) *Attorney, Agent, or Firm* — Arent Fox LLP

(57) ABSTRACT

A vehicle locking device locking a vehicle on a chassis dynamometer, equipped with rollers allowing driving wheels of the vehicle placed thereon, while keeping the driving wheels thereof placed on the rollers, was configured so as to detect angles of traction, to determine traction forces optimum for hauling the vehicle based on the detected angles, and to control the vehicle locking device based on thus-determined traction forces so as to take up a belt, aiming at readily and stably locking a test vehicle under optimum traction forces.

18 Claims, 6 Drawing Sheets

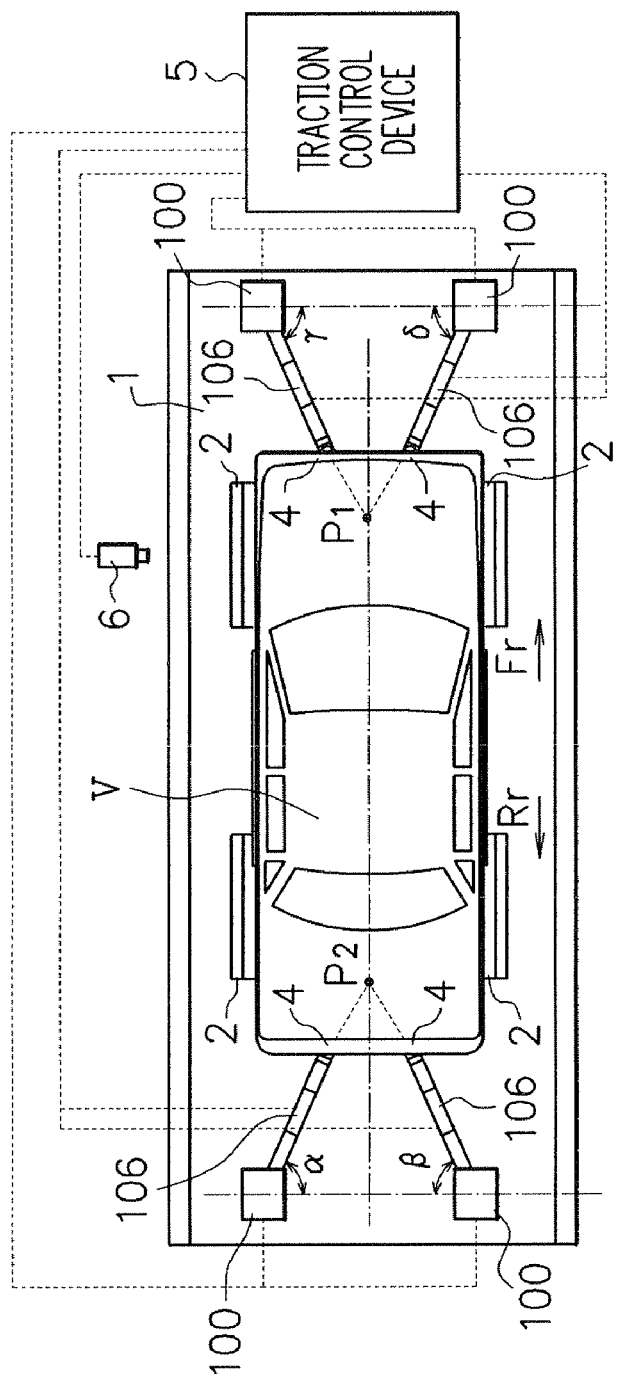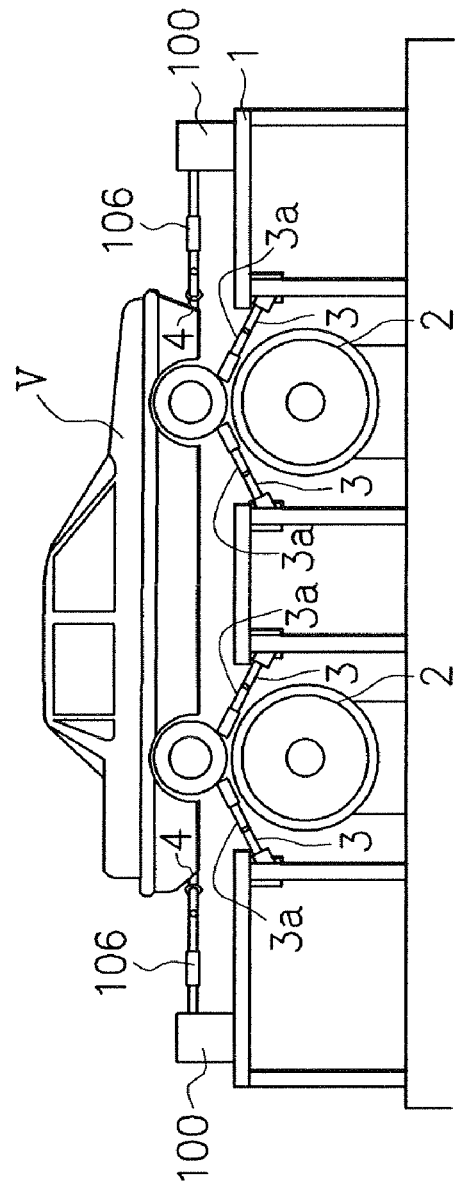

F I G. 6
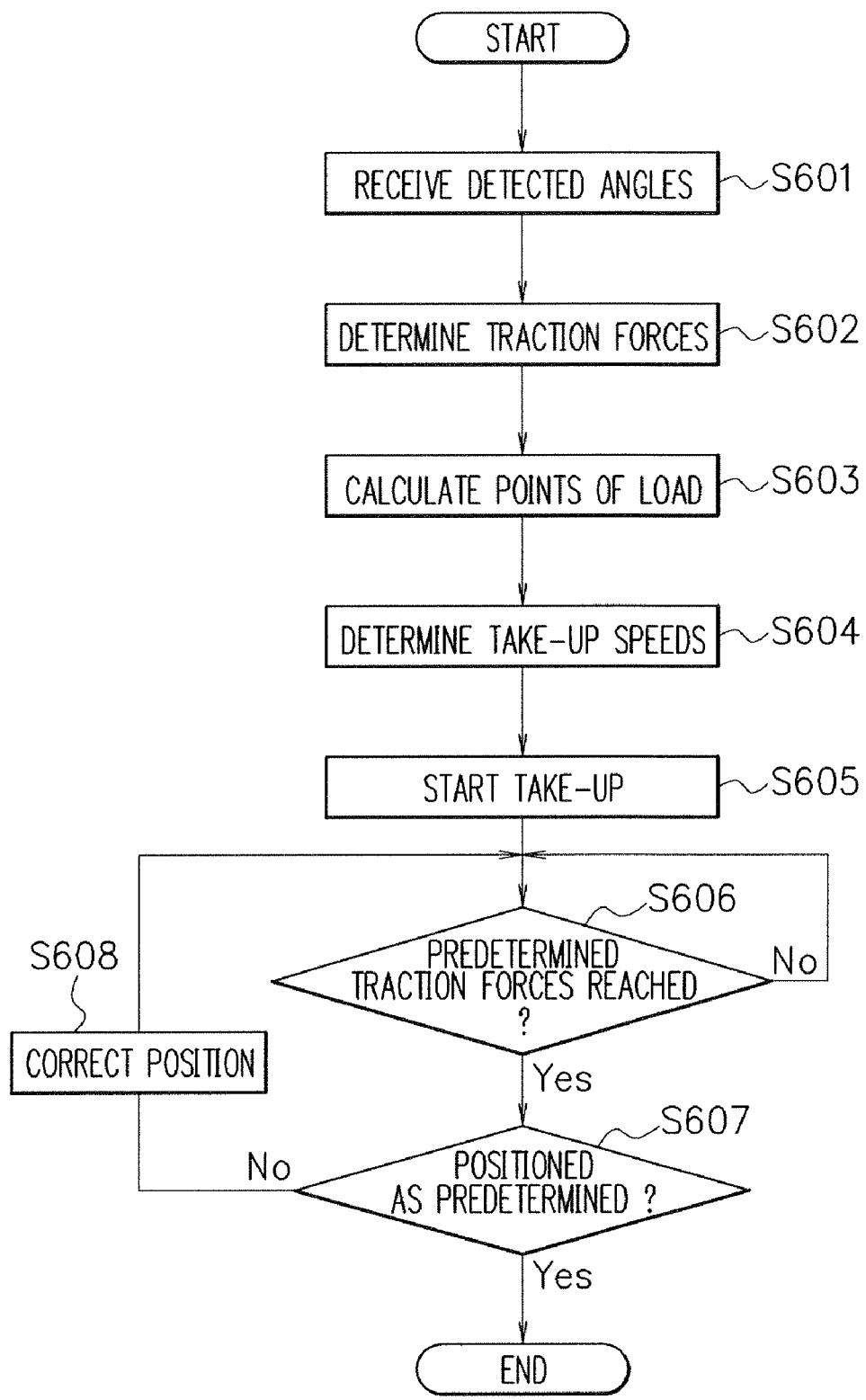

VEHICLE LOCKING DEVICE AND VEHICLE LOCKING METHOD

CROSS-REFERENCE TO RELATED APPLICATIONS

This application is based upon and claims the benefit of priority of the prior Japanese Patent Application No. 2007-306524, filed on Nov. 27, 2007, the entire contents of which are incorporated herein by reference.

BACKGROUND OF THE INVENTION

1. Field of the Invention

The present invention relates to a technique of locking a vehicle placed on a chassis dynamometer.

2. Description of the Related Art

In recent years, chassis dynamometer has been used for performance test of vehicles including automobiles. In this sort of performance test of vehicles, a test vehicle is set on the chassis dynamometer, and is then artificially driven according to a predetermined driving pattern, while simulating an actual road test, so as to enable measurement of various performances and characteristics, including fuel consumption, horse-power performance, and so forth.

On the chassis dynamometer, the test vehicle is necessarily positioned while placing the driving wheels thereof at desired positions on the rollers, and locked so as to avoid dislocation of the test vehicle after start of the test run. Conventionally, this sort of locking of the test vehicle has been accomplished by using belts or the like, so as to couple the test vehicle and locking portions disposed on the pit in the front and rear of the test vehicle, and to pull the individual belts (see Japanese Patent Application Laid-Open No. 10-307082, for example).

For the case of locking the test vehicle using the belts or the like, it is ideal to haul the test vehicle while keeping the driving wheels thereof stayed on the desired positions on the rollers, and to optimize traction force (tension) generated on the belts as a result of hauling so that the test vehicle may be locked in a stable manner.

However, no matter how the test vehicle could be hauled by the belts, while keeping the driving wheels of the test vehicle stayed on the desired positions on the rollers, it has not always been easy to optimize tension of the belts as a result of hauling. This is because, as for the belts stretched under tension while keeping a certain angle of inclination away from the test vehicle as disclosed in Japanese Patent Application Laid-Open No. 10-307082, it may be difficult to estimate correct force for optimizing the tension of the belts as a result of hauling, unless otherwise relative angle formed between the belts and the test vehicle may properly be detected. If the tension of the belts were uneven, the test vehicle may begin to roll when the test run starts, upon release of braking force which has been exerted to the test vehicle in the rest state, so that the vehicle performance test may adversely be affected.

SUMMARY OF THE INVENTION

It is therefore an object of the embodiments to provide, in consideration of the above-described situations, a vehicle locking device and a vehicle locking method, capable of readily and stably locking a vehicle under optimum traction forces.

According to an aspect of the embodiments, a vehicle locking device is configured as locking a vehicle on a chassis dynamometer, equipped with rollers allowing driving wheels of the vehicle placed thereon, while keeping the driving wheels thereof placed on the rollers, the device includes a traction unit hauling the vehicle from the front and the rear; an angle detection unit detecting angle of traction at which the traction unit hauls the vehicle; and a traction control unit determining traction force with which the vehicle is hauled based on the angle detected by the angle detection unit, and controlling operations of the traction unit based on thus-determined traction force.

In the vehicle locking device of the embodiments, the traction control unit determines operation speed of the traction unit, by specifying a point of traction load exerted to the vehicle based on an angle detected by the angle detection unit.

In the vehicle locking device of the embodiments, the traction control unit determines the traction force, based on driving force obtainable from the vehicle.

In the vehicle locking device of the embodiments, the traction control unit limits the traction force to be determined, corresponding to rigidity of a coupling unit coupling the traction unit and the vehicle.

In the vehicle locking device of the embodiments, the device further includes a traction force detection unit detecting the traction force exerted by the traction unit.

In the vehicle locking device of the embodiments, the traction control unit determines the traction force so as to balance the exerted traction force between the front and rear, and between the left and right of the vehicle.

In the vehicle locking device of the embodiments, the device further includes a position detection unit detecting position of the vehicle, wherein the traction control unit controls position of the vehicle while being mediated by the traction unit, based on results of detection by the position detection unit.

According to an aspect of the embodiment, a method of locking a vehicle is configured as locking a vehicle on a chassis dynamometer, equipped with rollers allowing driving wheels of the vehicle placed thereon, with the aid of a traction unit hauling the vehicle from the front and the rear, while keeping the driving wheels thereof placed on the rollers, the method includes an angle detection step detecting angle of traction at which the traction unit hauls the vehicle; and a traction control step determining traction force with which the vehicle is hauled based on the angle detected in the angle detection step, and controlling operations of the traction unit based on thus-determined traction force.

BRIEF DESCRIPTION OF DRAWINGS

FIGS. 1A and 1B illustrate a schematic configuration of a chassis dynamometer of an embodiment;

FIG. 6 is a flow chart explaining an operation flow of the traction control device of the embodiments.

DETAILED DESCRIPTION OF THE PREFERRED EMBODIMENTS

Figure 2A:
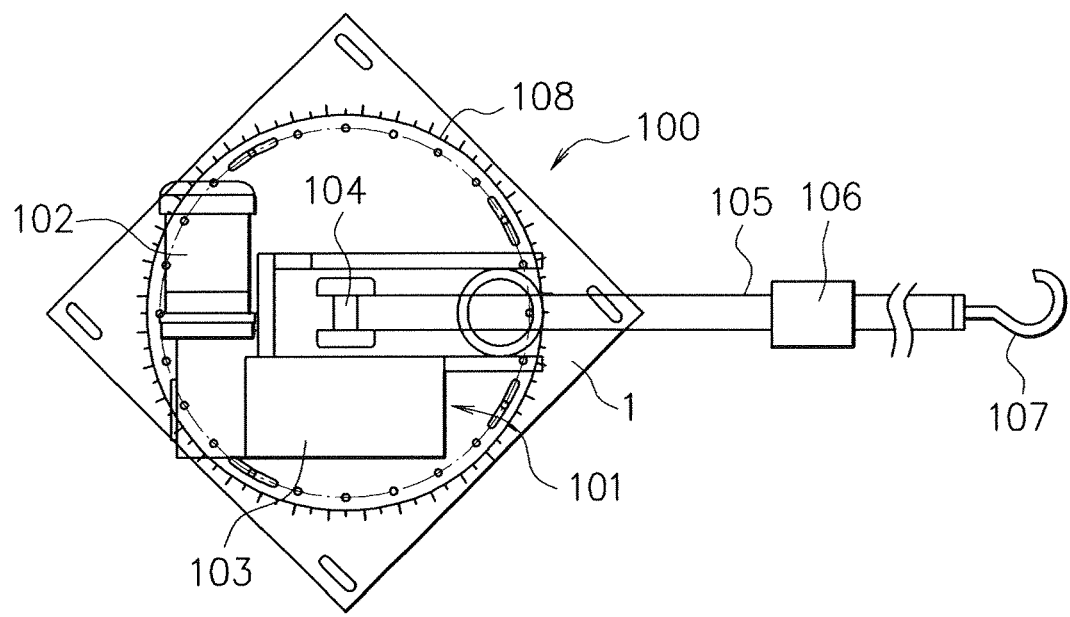
FIGS. 2A and 2B explain a vehicle locking device of an embodiment.

Preferred embodiments of the vehicle locking device will be explained with reference to accompanying drawings.

FIGS. 1A and 1B illustrate a schematic configuration of a chassis dynamometer equipped with a vehicle locking device of the embodiment, wherein FIG. 1A is a schematic plan view, and FIG. 1B is a schematic side elevation.

The chassis dynamometer assumes a four-wheel-drive vehicle as a test vehicle V to be tested, has a pit floor 1 laid over a pit where the chassis dynamometer is placed thereon, and the test vehicle V is disposed and locked at a predetermined position on the pit floor 1. In FIG. 1A, the forward and rear directions of the test vehicle V are indicated by arrows Fr and Rr, respectively.

When the test vehicle V is disposed and locked at the predetermined position on the pit floor 1, first, four wheels of the test vehicle V are placed respectively on the correspondent rollers 2. The individual wheels are then positioned at the predetermined positions on the rollers 2, using wheel positioning devices 3 respectively provided to each of four front, rear, left and right wheels. Each of the wheel positioning device 3 herein has a similar configuration, and positions each wheel by holding it by two pairs of arms 3a obliquely from the front and rear directions. Next, while the wheels of the test vehicle V are respectively kept positioned by the wheel positioning devices 3, the test vehicle V is locked by pulling the belts 105 using vehicle locking devices 100. The locking is accomplished by hauling the test vehicle V from the front and rear, so as to balance traction forces exerted to the test vehicle V between the front and rear, and between the left and right, with forces enough as much as preventing the test vehicle from being dislocated in the longitudinal direction and in the transverse direction after start of the test run. Paragraphs below will detail the vehicle locking device 100 hauling the test vehicle V for the purpose of locking.

In this embodiment, four vehicle locking devices 100 are used while being paired and disposed on the pit floor 1 pair-by-pair, on the front and the rear of the test vehicle V, wherein vehicle locking devices 100 composing each pair, disposed respectively on the front and the rear, are located as being distant by the same distance away from the center of the test vehicle V in the width-wise direction.

Figure 2B:
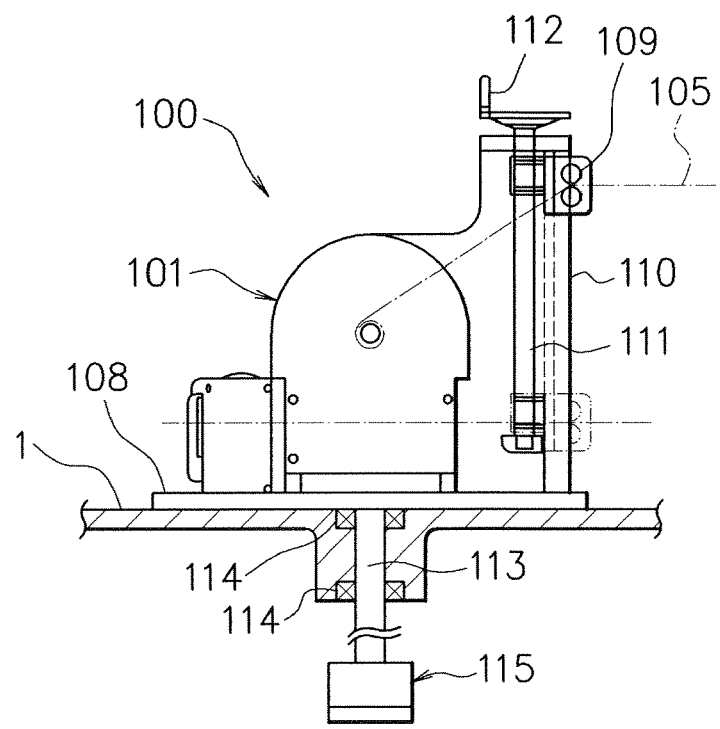

The vehicle locking device 100 has a belt take-up unit 101 composing the substantial main unit thereof, as illustrated in FIGS. 2A and 2B. The belt take-up unit 101 is mounted on a base 108 supported on the pit floor 1 in a freely rotatable manner. Details of the base 108 will be described later.

The belt take-up unit 101 has a motor unit 102 disposed on the base 108 while being immobilized thereto, a reduction gear 103 coupled with the motor unit 102, and a take-up shaft 104 coupled with the reduction gear 103. One end of the belt 105 having a certain degree of stretchability is introduced to the take-up shaft 104 while being held by a guide, and thereby the belt 105 may be taken up by rotating the take-up shaft 104. The other end of the belt 105 is provided with a traction hook 107 to be coupled with the test vehicle V in order to haul it, and the belt 105 is provided, at an appropriate portion thereof, with a tension sensor 106 typically configured by a load cell. The guide 109 is supported along a support pillar 110 stood on the base 108, while being movable in the vertical direction by a predetermined stroke, and is more specifically engaged with a lead screw 111 attached to the support pillar 110, so as to allow vertical movement while being assisted by the lead screw 111 through operation of a handwheel 112.

The above-described base 108 has, as illustrated in FIG. 2B, an axis of rotation 113 which perpendicularly extends downwards below the floor 1, wherein the axis of rotation 113 is axially supported by a bearing 114 disposed in the pit floor 1. The axis of rotation 113 is also provided with an angle detection mechanism detecting the amount of rotation of the axis of rotation 113, that is, an angle detection device 115 configured as detecting angle of rotation of the base 108 relative to the pit floor 1, at an appropriate position thereof (for example, the bottom end of the axis of rotation 113). By providing the angle detection device 115 in this way, the vehicle locking device 100 can calculate an angle of rotation of the base 108 relative to the pit floor 1. An encoder or a potentiometer, for example, may be adoptable as the angle detection device 115, wherein the relative angle of rotation may be calculated based on output signal from the encoder or the potentiometer.

The vehicle locking device 100 of this embodiment may be configured as described in the above. Next, locking of the test vehicle V using the vehicle locking device 100 will be detailed referring to FIGS. 1A and 1B. As has been described in the above, the vehicle locking device 100 locks the test vehicle V, by pulling the belts 105 while keeping the wheels of the test vehicle V respectively positioned by the wheel positioning devices 3, wherein first the traction hooks 107 of the belts 105 are hooked on the engagement portions 4 (see FIGS. 1A and 1B) of the test vehicle V. In this embodiment, the test vehicle V has four, in total, engagement portions, two in the front and two in the rear, wherein the traction hook 107 is hooked on each of them. Each belt 105 is taken up enough to as much as being extended under tension.

By extending the belts 105 under tension by hooking the traction hooks 107 on the test vehicle V as in the above-described state, the vehicle locking device 100 can detect an angle of rotation of the base 108 relative to the pit floor 1 with the aid of the angle detection device 115, and can detect an angle formed between the belt 105 and the test vehicle V (angle of traction formed between the belt 105 and the test vehicle V). In this embodiment, as illustrated in FIGS. 1A and 1B, the vehicle locking devices 100 on the rear side detect angles $\alpha$, $\beta$, and the vehicle locking devices 100 on the front side detect angles $\gamma$, $\delta$. The individual angles detected herein are defined on the basis of the direction (width-wise direction) normal to the longitudinal direction of the test vehicle V, so that the individual vehicle locking devices 100 disposed on the front and the rear are horizontally aligned in the width-wise direction.

The vehicle locking devices 100 output thus-detected angles $\alpha$, $\beta$, $\gamma$ and $\delta$ to a traction control device 5 as angle signals. The traction control device 5 takes part in controlling take-up of the belts 105 and so forth, and is composed of a personal computer or the like. The traction control device 5 is connected also to the tension sensor 106 such as a load cell, and a wheel position detection device 6 in a wired or wireless manner.

The traction control device 5 then calculates optimum traction forces based on the angles received from the vehicle locking device 100, according to the equations (1) to (4) below:

$$F_A \cos \alpha - F_B \cos \beta = 0 \qquad (1)$$

$$F_A \sin \alpha + F_B \sin \beta = F_{max} \qquad (2)$$

$$F_C \cos \gamma - F_D \cos \delta = 0 \qquad (3)$$

$$F_C \sin \gamma + F_D \sin \delta = F_{max} \qquad (4)$$

In the equations (1) to (4), each of $F_A$, $F_B$, $F_C$ and $F_D$ is an optimum traction force with which each of four vehicle locking devices 100 pulls the belt 105, and corresponds to tension generated on each belt 105. $F_{max}$ represents maximum driving force obtainable from the test vehicle V. The equations (1) to (4) will be detailed below, referring to FIG. 3.

Figure 3:
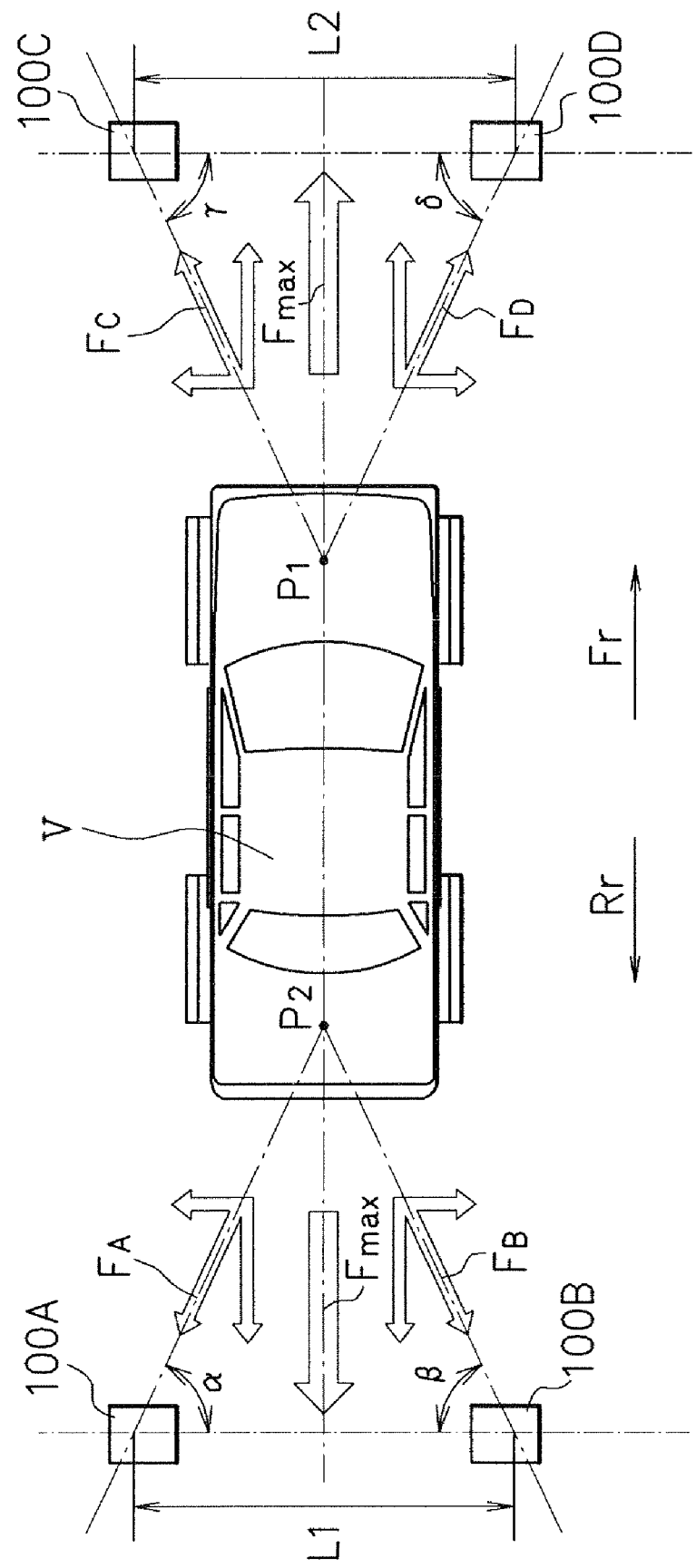
FIG. 3 explains traction forces exerted when a vehicle locking device of an embodiment locks a test vehicle.

FIG. 3 is a schematic drawing illustrating a state of the test vehicle V applied with the traction forces. For convenience's sake, a vehicle locking device on the upper rear side of the drawing is denoted as 100A, a vehicle locking device on the lower side of the drawing as 100B, a vehicle locking device on the front upper side is denoted as 100C, and a vehicle locking device on the lower side of the drawing as 100D. The individual forces with which the vehicle locking devices 100A to 100D haul the test vehicle V are denoted as $F_A$, $F_B$, $F_C$ and $F_D$, respectively. These forces were explained in the above as the optimum traction forces, wherein the optimum traction force means a force capable of balancing longitudinal components and transverse components of the traction force exerted to the test vehicle V, and of consequently preventing the test vehicle V from being dislocated after start of the test run. In other words, the equations (1) to (4) give forces satisfying such conditions. $F_{max}$ in the equations (2), (4), which express balance between components in the longitudinal direction, is determined by "$F_{max}$=ma", where "m" represents weight of the test vehicle V, and "a" represents maximum rate of acceleration of the test vehicle V determined by a driving pattern or performances. By adopting such $F_{max}$, the test vehicle V may be prevented from jumping forward, even if the test vehicle outputs the maximum driving force when the test run is started. The equations (1) to (4) in the above are solved to give the values shown below.

$$F_A = F_{max} (\cos \beta / (\sin \alpha \cos \beta + \sin \beta \cos \alpha))$$

$$F_B = F_{max} (\cos \alpha / (\sin \alpha \cos \beta + \sin \beta \cos \alpha))$$

$$F_C = F_{max} (\cos \delta / (\sin \gamma \cos \delta + \sin \delta \cos \gamma))$$

$$F_D = F_{max} (\cos \gamma / (\sin \gamma \cos \delta + \sin \delta \cos \gamma))$$

Based on thus-obtained optimum traction forces $F_A$, $F_B$, $F_C$ and $F_D$, the traction control device 5 instructs the vehicle locking devices 100 to lock the test vehicle V, thereby the test vehicle V is stably locked by the vehicle locking devices 100. The individual components of the traction force in the longitudinal direction appear in the equations (1) to (4) may have a force larger than $F_{max}$, although the above-described example adopted $F_{max}$, which is the maximum driving force obtainable from the test vehicle V.

When the traction force is determined, it is preferable to appropriately set the upper limit of the traction force, taking rigidity of engagement portions 4 of the test vehicle V into consideration. By setting such limitation, a stable test run may be ensured, while excluding adverse influences on the engagement portions 4 ascribable to the driving force during simulative run of the test vehicle V.

Now, another example of locking a test vehicle V', different from the above-described test vehicle V, using the vehicle locking devices 100 will be explained. The test vehicle to be submitted to the test on the chassis dynamometer may have engagement portions 4, on which the traction hooks 107 are hooked, dislocated from the center of the test vehicle V in the width-wise direction. Also in this case, the vehicle locking devices 100 can lock the test vehicle under optimum traction forces. Paragraphs below will explain, referring to FIG. 4, a method of determining optimum traction forces for an exemplary case where the engagement portions 4 of the vehicle are off-centered in the width-wise direction.

Figure 4:
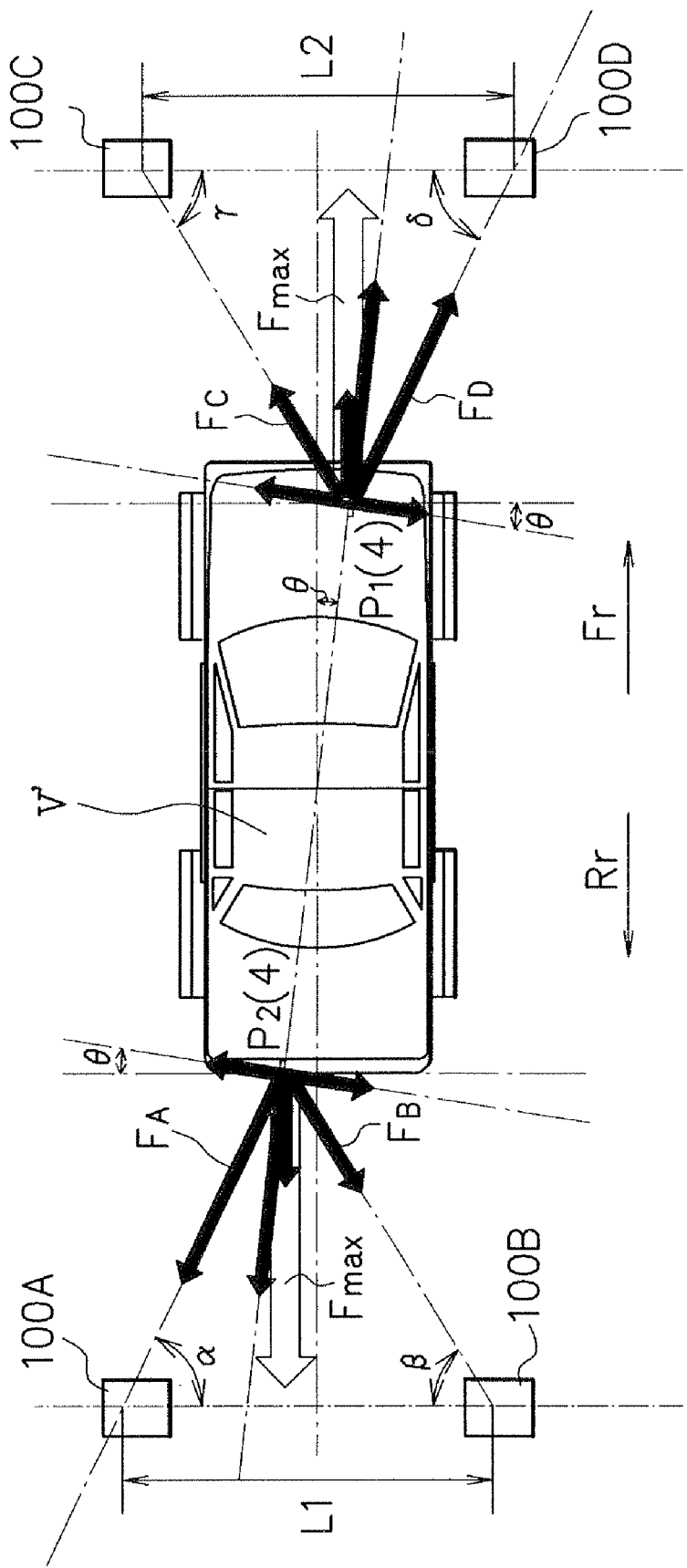
FIG. 4 explains traction forces exerted when a vehicle locking device of another embodiment locks a test vehicle.

FIG. 4 is a schematic drawing illustrating a state of the test vehicle V' applied with the traction forces. In this drawing, similarly to as in FIG. 3, a vehicle locking device on the upper rear side of the drawing is denoted as 100A, a vehicle locking device on the lower side of the drawing as 100B, a vehicle locking device on the front upper side is denoted as 100C, and a vehicle locking device on the lower side of the drawing as 100D for the convenience's sake. The individual forces with which the vehicle locking devices 100A to 100D haul the test vehicle V are denoted as $F_A$, $F_B$, $F_C$ and $F_D$, respectively.

As illustrated in FIG. 4, the engagement portions 4 of the test vehicle V' are off-centered in the width-wise direction (disposed at the positions indicated by the points of load P1, P2). It is obvious that the points of load P1 and P2 in this case are off-centered by θ in the width-wise direction of the test vehicle V', when viewed as being connecting by a virtual line. The angle θ may be calculated based on angles of rotation of the bases 108 relative to the pit floor 1 respectively detected by the angle detection devices 115 of the vehicle locking devices 100. More specifically, the traction control device 5 can calculate angle θ, by calculating positions of the points of load P1 and P2 based on the received angles, and by finding dislocation of the horizontally-aligned vehicle locking devices 100 from the center. The traction control device 5 then determines optimum traction forces, based on the angles output from the vehicle locking devices 100 (denoted as α, β, γ and δ, similarly to as in FIG. 3) and the calculated angle θ, according to the equations (5) to (8) below.

$$F_A \cos(\alpha+\theta) - F_B \cos(\beta-\theta) = 0 \quad (5)$$

$$F_A \sin(\alpha+\theta) + F_B \sin(\beta-\theta) = F_{max}/\cos\theta \quad (6)$$

$$F_C \cos(\gamma-\theta) - F_D \cos(\delta+\theta) = 0 \quad (7)$$

$$F_C \sin(\gamma-\theta) + F_D \sin(\delta+\theta) = F_{max}/\cos\theta \quad (8)$$

The equations (5) to (8) differ from the above-described equations (1) to (4) in that the angle θ representing dislocation of the points of load P1, P2 is taken into consideration. By solving the equations (5) to (8), the optimum traction forces may be calculated, also for the case where the engagement portions 4 on which the traction hooks 107 are hooked are off-centered in the width-wise direction of the test vehicle V. By locking under the optimum traction forces, the test vehicle V' may stably be locked by the vehicle locking devices 100.

As has been described in the above, the vehicle locking devices 100 lock the test vehicle V or V' with the above-described optimum traction forces, wherein also take-up speeds (driving speeds) of the belts 105 optimum for pulling the belts 105 are taken into consideration. By virtue of this consideration, the test vehicle V or V' may successfully be prevented from deviating or dislocating in the longitudinal direction, upon being applied with unexpected forces in the transverse and longitudinal directions. The take-up speed may be calculated based on distance between each of the vehicle locking devices 100, and the points of load P1, P2 when the test vehicle V or V' is hauled. First, the equations (9) to (12) determining distances between each of the locking devices 100 and the points of load P1, P2 will be explained below, referring to an exemplary case of the test vehicle V'.

$$d_A \cos \alpha + d_B \cos \beta = L_1 \quad (9)$$

$$d_A \sin \alpha - d_B \sin \beta = 0 \quad (10)$$

$$d_C \cos \gamma + d_D \cos \delta = L_2 \quad (11)$$

$$d_C \sin \gamma - d_D \sin \delta = 0 \quad (12)$$

Figure 5:
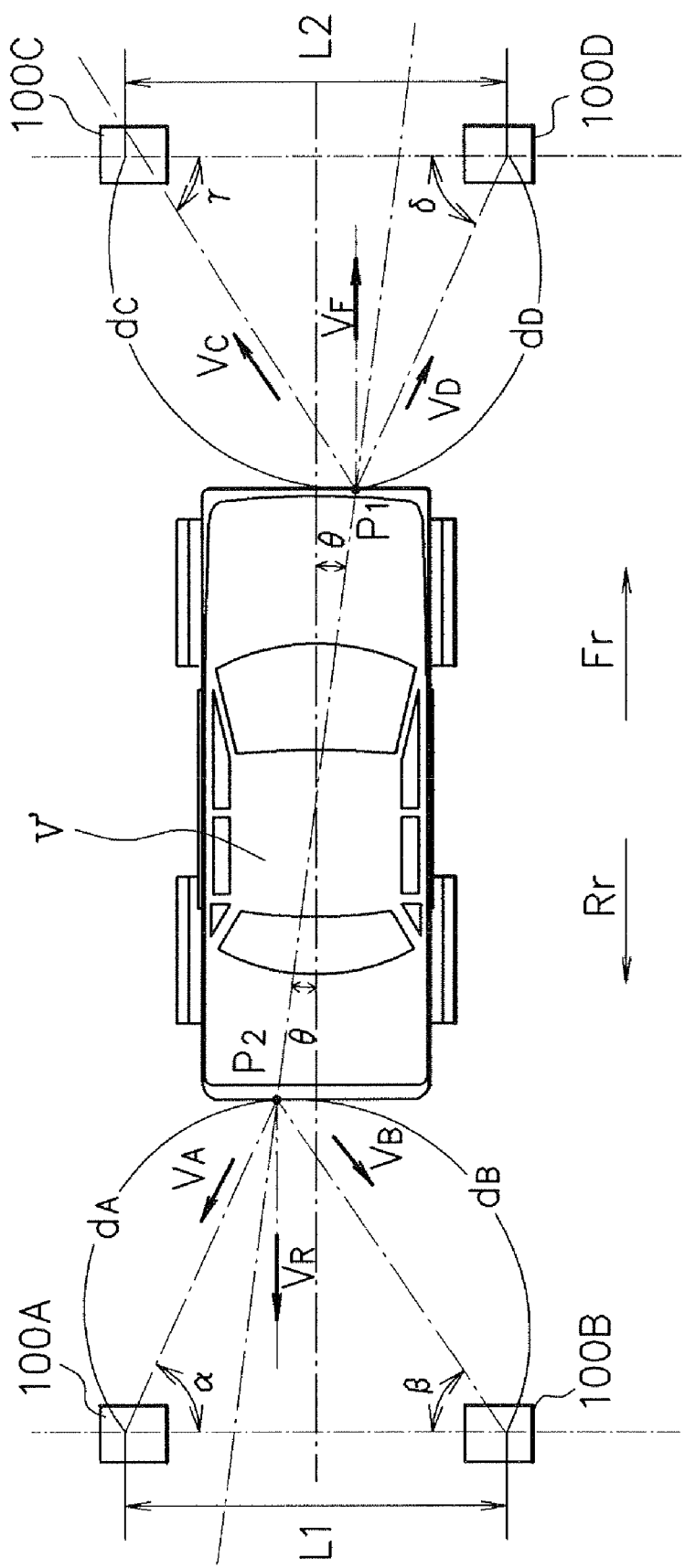
FIG. 5 explains take-up speed of the belts when the vehicle locking device of the embodiments locks a test vehicle.

As is obvious from FIG. 5, in the equations (9) to (12) $D_A$ represents distance between the vehicle locking device 101A and the point of load P2, and $d_B$ represents distance between the vehicle locking device 100B and the point of load P2. In addition, $d_C$ represents distance between the vehicle locking device 100C and the point of load P1, and $d_D$ represents distance between the vehicle locking device 100D and the point of load P1. L1 represents distance between the vehicle locking device 101A and the vehicle locking device 100B, and L2 represents distance between the vehicle locking device 100C and the vehicle locking device 100D. These equations shall commonly apply also to the test vehicle V.

After the distances between each of the vehicle locking devices 100 and each of the points of load are determined according to the equations (9) to (12), the traction control device 5 then determines the take-up speeds $V_A$, $V_B$, $V_C$ and $V_D$ of the vehicle locking devices 100A to 100D, respectively, so as to satisfy the equations (13) to (15) below.

$$V_A : V_B = d_A : d_B \quad (13)$$

$$V_C : V_D = d_C : d_D \quad (14)$$

$$V_F = V_R \quad (15)$$

In the equation (15), $V_F$ and $V_R$ represent travel speeds of the test vehicle V' in the longitudinal direction, ascribable to take-up of the belts 105 by the vehicle locking devices 100. By starting take-up of the belts 105 at speeds $V_A$, $V_B$, $V_C$ and $V_D$ determined so as to satisfy the above-described equations (13) to (15), the vehicle locking devices 100 now become possible to lock the test vehicle V' so as to inhibit movement. The relations expressed by the equations (13) to (15) shall commonly apply also to the test vehicle V.

In the process of starting pulling of the belts 105 by the vehicle locking devices 100 at the speeds determined as described in the above, and gradually strengthening the traction forces, the traction control device 5 receives results of detection from the tension sensors 106. The traction control device 5 is designed to direct the vehicle locking devices 100 to interrupt take-up of the belts 105, when tension of the individual belts 105 reaches the optimum traction forces initially determined.

By virtue of this operation, the vehicle locking devices 100 can stably lock the vehicle with the optimum traction forces, without causing dislocation of the vehicle.

The vehicle locking devices 100 additionally have a function of correcting position of the vehicle after being locked. The function of correction will be explained below.

The vehicle locking devices 100 lock the test vehicle as described in the above without causing dislocation, whereas the wheels may sometimes be dislocated from the initially-determined positions on the rollers 2. Amount of dislocation herein is detected by the wheel position detection device 6, and input to the traction control device 5. The traction control device 5 controls the vehicle locking devices 100 based on the input amount of dislocation, so as to move the test vehicle to a predetermined position on the rollers 2. In this case, the traction control device 5 determines the take-up speeds of the individual vehicle locking devices 100, by replacing $F_A$, $F_B$, $F_C$ and $F_D$ obtained by solving the above-described equations (1) to (4) or the equations (5) to (8) with the individual take-up speeds of the vehicle locking devices 100, and by replacing $F_{max}$ with an arbitrary speed, and then controls the vehicle locking devices 100 so as to take up the belts 105 to as much as the amount of dislocation at the take-up speeds thus determined. By determining the take-up speeds according to the equations (1) to (4) or the equations (5) to (8) expressing the balance, the amount of dislocation may be corrected, while keeping the traction force exerted to the test vehicle at a constant level.

An operation flow of the traction control device 5, taking part in various calculations as described in the above, and controlling operations of the vehicle locking devices 100 so as to allow them to execute a plurality of operations, will be explained referring to FIG. 6.

First, in step S601, the traction control device 5 receives angles detected by the angle detection devices 115 of the vehicle locking devices 100.

Next, in step S602, the traction control device 5 determines traction forces of the vehicle locking devices 100, based on the angles received in step S601.

Next, in step S603, the traction control device 5 calculates points of traction load exerted to the test vehicle through the belts 105 of the vehicle locking devices, based on the angles received in step S601.

Next, in step S604, the traction control device 5 determines take-up speeds of the belts 105 of the vehicle locking devices 100, based on the points of traction load calculated in step S603.

Next, in step S605, the traction control device 5 instructs the vehicle locking devices 100 to take up the belts at the speeds determined in step S604.

Next, in step S606, the traction control device 5 monitors whether the tension detected by the tension sensors 106 have reached the traction force determined in step S602 or not, and upon judgment of that the traction force has been reached, the process advances to step S607.

Next, in step S607, the traction control device 5 confirms position of the test vehicle using the wheel position detection device 6, and upon confirmation of the vehicle at a predetermined position, the process comes to the end and thereby the locking completes. On the other hand, upon confirmation of the vehicle dislocated from the predetermined position on the rollers 2, the position is corrected in step S608. The position is corrected herein by correcting the amount of dislocation, while keeping the tension exerted to the test vehicle at a constant level as described in the above.

As has been described in the above, the vehicle locking devices 100 of this embodiment were configured to detect angle between the belts 105 of the vehicle locking devices 100 and the test vehicle V or V', and to determine optimum traction forces based on thus-detected angles, so as to balance the longitudinal and transverse components of the traction forces exerted to the test vehicle V or V', and so as to prevent the test vehicle V or V' from dislocating after start of the test run, to thereby control the hauling. In this way, the test vehicle may readily and stably be locked under the optimum traction forces.

In addition, the test vehicle V or V' may be locked so as not to cause dislocation from a predetermined position on the rollers 2, also by finding the points of traction load where the traction forces of the vehicle locking devices 100 are substantially applied based on the detected angles, and by determining speeds of taking up the belts 105.

More stable test run may be accessible by determining the traction force based on the detected angles, while considering driving force of the test vehicle V or V', and rigidity of the engagement portions 4 (coupling unit).

The vehicle locking devices 100 hauling the test vehicle V or V' described in the embodiments in the above were configured as being integrated with the angle detection devices 115, whereas another possible configuration may be typically such as disposing non-contact position sensors at the engagement portions 4 of the test vehicle V or V', so as to determine angles and points of traction load.

The vehicle locking devices 100, arranged in the above-described embodiments as being horizontally aligned in the width-wise direction respectively on the front and the rear, may be arranged as being shifted in the longitudinal direction.

In this case, it may be good enough to preliminarily determine angles and distances among the vehicle locking devices 100 ascribable to the longitudinal shifting.

Angles detected by the angle detection devices 115 in the above-described embodiments were angles of the belts 105 away from the direction (width-wise direction) normal to the longitudinal direction of the test vehicle V or V', whereas, while setting the longitudinal direction as a standard, also angles formed between the longitudinal direction of the vehicle and the belts 105 may be detected.

According to the embodiments, the test vehicle may stably and readily be locked under the optimum traction forces.

What is claimed is:

1. A vehicle locking device locking a vehicle on a chassis dynamometer, equipped with rollers allowing driving wheels of the vehicle placed thereon, while keeping the driving wheels thereof placed on the rollers, comprising:
   a traction unit hauling the vehicle from the front and the rear;
   an angle detection unit detecting angle of traction at which the traction unit hauls the vehicle; and
   a traction control unit determining traction force with which the vehicle is hauled based on the angle detected by the angle detection unit, and controlling operations of the traction unit based on thus-determined traction force.

2. The vehicle locking device according to claim 1, wherein the traction control unit determines the traction force so as to balance the exerted traction force between the front and rear, and between the left and right of the vehicle.

3. The vehicle locking device according to claim 2, wherein the traction control unit determines the traction force, based on driving force obtainable from the vehicle.

4. The vehicle locking device according to claim 3, wherein the traction control unit limits the traction force to be determined, corresponding to rigidity of a coupling unit coupling the traction unit and the vehicle.

5. The vehicle locking device according to claim 3, wherein the traction control unit determines operation speed of the traction unit, by specifying a point of traction load exerted to the vehicle based on an angle detected by the angle detection unit.

6. The vehicle locking device according to claim 2, wherein the traction control unit limits the traction force to be determined, corresponding to rigidity of a coupling unit coupling the traction unit and the vehicle.

7. The vehicle locking device according to claim 6, wherein the traction control unit determines operation speed of the traction unit, by specifying a point of traction load exerted to the vehicle based on an angle detected by the angle detection unit.

8. The vehicle locking device according to claim 2, wherein the traction control unit determines operation speed of the traction unit, by specifying a point of traction load exerted to the vehicle based on an angle detected by the angle detection unit.

9. The vehicle locking device according to claim 1, wherein the traction control unit determines the traction force, based on driving force obtainable from the vehicle.

10. The vehicle locking device according to claim 9, wherein the traction control unit limits the traction force to be determined, corresponding to rigidity of a coupling unit coupling the traction unit and the vehicle.

11. The vehicle locking device according to claim 10, wherein the traction control unit determines operation speed of the traction unit, by specifying a point of traction load exerted to the vehicle based on an angle detected by the angle detection unit.

12. The vehicle locking device according to claim 9, wherein the traction control unit determines operation speed of the traction unit, by specifying a point of traction load exerted to the vehicle based on an angle detected by the angle detection unit.

13. The vehicle locking device according to claim 1, wherein the traction control unit limits the traction force to be determined, corresponding to rigidity of a coupling unit coupling the traction unit and the vehicle.

14. The vehicle locking device according to claim 13, wherein the traction control unit determines operation speed of the traction unit, by specifying a point of traction load exerted to the vehicle based on an angle detected by the angle detection unit.

15. The vehicle locking device according to claim 1, wherein the traction control unit determines operation speed of the traction unit, by specifying a point of traction load exerted to the vehicle based on an angle detected by the angle detection unit.

16. The vehicle locking device according to claim 1, further comprising a traction force detection unit detecting the traction force exerted by the traction unit.

17. The vehicle locking device according to claim 1, further comprising a position detection unit detecting position of the vehicle,
   wherein the traction control unit controls position of the vehicle while being mediated by the traction unit, based on results of detection by the position detection unit.

18. A method of locking a vehicle on a chassis dynamometer, equipped with rollers allowing driving wheels of the vehicle placed thereon, with the aid of a traction unit hauling the vehicle from the front and the rear, while keeping the driving wheels thereof placed on the rollers, the method comprising:
   an angle detection step detecting angle of traction at which the traction unit hauls the vehicle; and
   a traction control step determining traction force with which the vehicle is hauled based on the angle detected in the angle detection step, and controlling operations of the traction unit based on thus-determined traction force.

* * * * *